United States Patent
Guillaume et al.

(10) Patent No.: US 10,536,994 B2
(45) Date of Patent: Jan. 14, 2020

(54) HEATABLE PANE WITH HIGH-FREQUENCY TRANSMISSION

(71) Applicant: SAINT-GOBAIN GLASS FRANCE, Courbevoie (FR)

(72) Inventors: Francois Guillaume, Aachen (DE); Stefan Droste, Herzogenrath (DE); Bernd Stelling, Bielefeld (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 574 days.

(21) Appl. No.: 15/100,280

(22) PCT Filed: Dec. 5, 2014

(86) PCT No.: PCT/EP2014/076676
§ 371 (c)(1),
(2) Date: May 27, 2016

(87) PCT Pub. No.: WO2015/091016
PCT Pub. Date: Jun. 25, 2015

(65) Prior Publication Data
US 2016/0374150 A1    Dec. 22, 2016

(30) Foreign Application Priority Data

Dec. 16, 2013 (EP) .................... 13197404

(51) Int. Cl.
*H05B 3/84* (2006.01)
(52) U.S. Cl.
CPC ......... *H05B 3/84* (2013.01); *H05B 2203/002* (2013.01)
(58) Field of Classification Search
CPC ... H05B 3/00; H05B 3/84; H05B 3/86; H05B 2203/001; H05B 2203/002;
(Continued)

(56) References Cited

U.S. PATENT DOCUMENTS 2,878,357 A * 3/1959 Thomson .......... B32B 17/10036
219/203
6,356,236 B1    3/2002 Maeuser et al.
(Continued)

FOREIGN PATENT DOCUMENTS

CA    2005634    6/1990
DE    198 17 712    2/2000
(Continued)

OTHER PUBLICATIONS

International Search Report for International Application No. PCT/EP2014/076676 filed on Dec. 5, 2014 in the name of Saint-Gobain Glass France. (English translation and German original) dated Feb. 6, 2015.
(Continued)

*Primary Examiner* — Dana Ross
*Assistant Examiner* — Ayub A Maye
(74) *Attorney, Agent, or Firm* — Pittsbury Winthrop Shaw Pittman LLP

(57) ABSTRACT

A pane, having at least one first pane with an outer face and an inner face is described. The pane has at least one electrically conductive transparent coating which is arranged on the outer face and/or the inner face of the first pane, and at least two busbars which are provided for connecting to a voltage source and which are connected to the electrically conductive transparent coating such that a current path for a heating current is formed between the busbars. The electrically conductive transparent coating has at least three regions with decoated structures.

15 Claims, 12 Drawing Sheets

Figure 1:
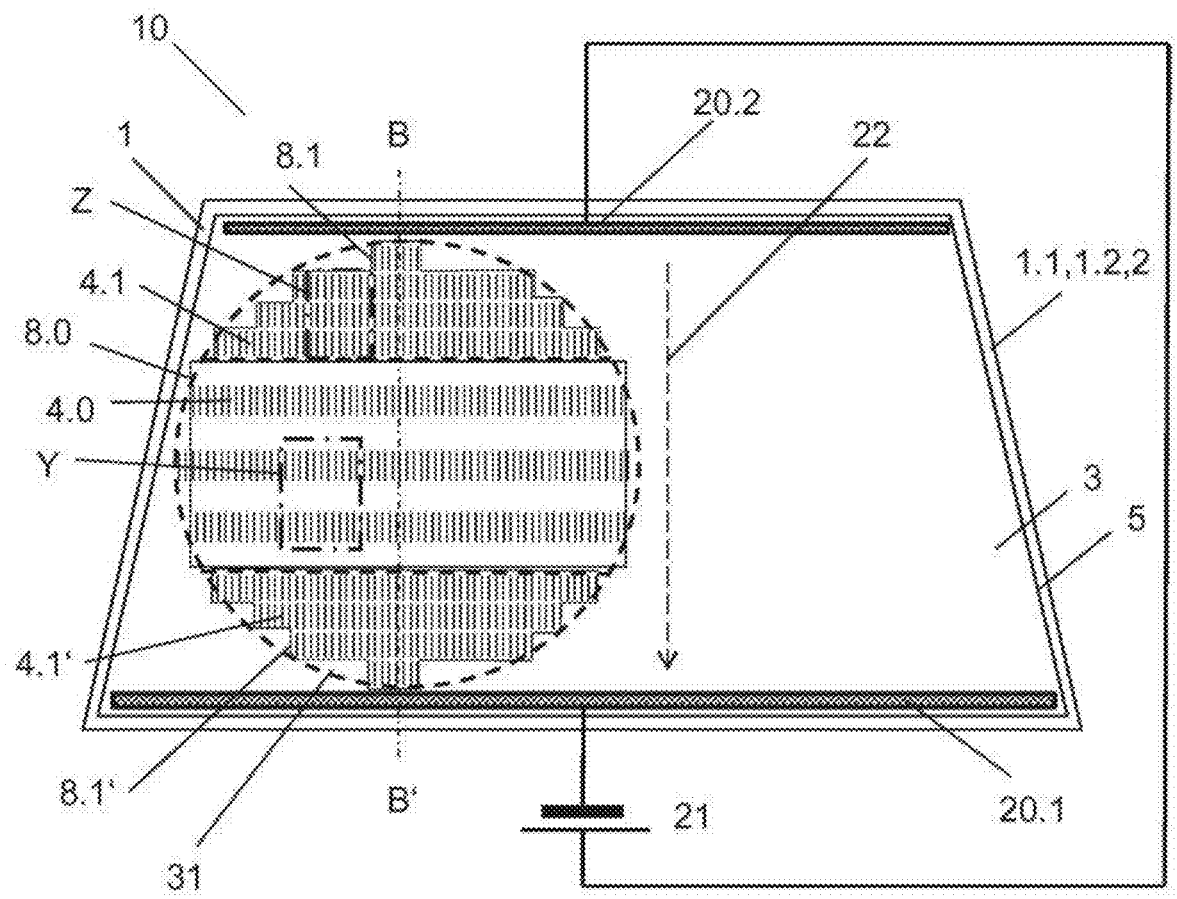

(58) Field of Classification Search
CPC ........ H05B 2203/003; H05B 2203/004; H05B 2203/011
USPC ........................................ 219/200, 203, 553
See application file for complete search history.

(56) References Cited

U.S. PATENT DOCUMENTS

| | | | |
|---|---|---|---|
| 6,582,809 B2 | 6/2003 | Boire et al. | |
| 7,132,625 B2* | 11/2006 | Voeltzel | B32B 17/10036 219/203 |
| 8,309,390 B2 | 11/2012 | Lerchenberger et al. | |
| 2003/0019860 A1* | 1/2003 | Sol | B32B 17/10192 219/203 |
| 2003/0080909 A1 | 5/2003 | Voeltzel et al. | |
| 2004/0200821 A1 | 10/2004 | Voeltzel | |
| 2005/0056638 A1* | 3/2005 | Maeuser | B32B 17/10036 219/543 |
| 2006/0081581 A1* | 4/2006 | Odeh | H05B 3/84 219/203 |
| 2007/0108175 A1* | 5/2007 | Andrt | B64F 1/06 219/203 |
| 2011/0108537 A1* | 5/2011 | Schall | B32B 17/10036 219/201 |
| 2011/0139756 A1 | 6/2011 | Raible et al. | |
| 2011/0266275 A1* | 11/2011 | Rateiczak | H05B 3/84 219/538 |

FOREIGN PATENT DOCUMENTS

| | | |
|---|---|---|
| DE | 10 2011 115 967 A1 | 4/2013 |
| EP | 0 717 459 | 6/1990 |
| EP | 378917 | 7/1990 |
| EP | 0 717 459 A1 | 6/1996 |
| EP | 0 847 965 | 6/1998 |
| EP | 1 168 888 A2 | 1/2002 |
| EP | 1 605 729 | 12/2005 |
| EP | 2 139 049 | 12/2009 |
| EP | 2 200 097 | 2/2010 |
| JP | H08-250915 A | 9/1996 |
| JP | 2003-069282 A | 3/2003 |
| JP | 2003-170739 A | 6/2003 |
| JP | 2006-526944 A | 11/2006 |
| WO | 2004/051869 A2 | 6/2004 |
| WO | 2010/043598 | 4/2010 |
| WO | 2011/023974 A2 | 3/2011 |

OTHER PUBLICATIONS

Written Opinion for International Application No. PCT/EP2014/076676 filed Dec. 5, 2014 on behalf of Saint-Gobain Glass France, dated Feb. 6, 2015. 21 pages (English Translation + German Original).

* cited by examiner

HEATABLE PANE WITH HIGH-FREQUENCY TRANSMISSION

CROSS REFERENCE TO RELATED APPLICATIONS

The present application is the U.S. national stage entry of International Patent Application No. PCT/EP2014/076676, filed internationally on Dec. 5, 2014, which, in turn, claims priority to European Patent Application No. 13197404.0, filed on Dec. 16, 2013.

The invention relates to an electrically heatable pane, in particular a vehicle window pane, with a transparent, electrically conductive coating and low transmission attenuation for electromagnetic radiation in the high-frequency range. The invention further relates to a method for producing such a pane and its use.

Current motor vehicles require a large number of technical devices for transmitting and receiving electromagnetic radiation for the operation of basic services such as radio reception, preferably in the bands AM, FM, or DAB, mobile telephony in the bands GSM 900 and DCS 1800, UMTS and LTE as well as satellite-supported navigation (GPS) and WLAN.

At the same time, modern vehicle glazings increasingly have all-sided and full-surface electrically conductive coatings transparent to visible light. These transparent, electrically conductive coatings protect, for example, interiors against overheating due to sunlight or against cooling, by reflecting incident thermal radiation, as is known from EP 378917 A. Transparent, electrically conductive coatings can effect targeted warming of the pane by application of an electrical voltage, as is known from WO 2010/043598 A1.

Common to the transparent, electrically conductive coatings is the fact that they are also impermeable to electromagnetic radiation in the high-frequency range. An all-sided and full-surface glazing of a vehicle with transparent, electrically conductive coatings renders transmission and reception of electromagnetic radiation in the interior no longer possible. For the operation of sensors such as rain sensors, camera systems, or fixed antennas, one or two localized regions of the electrically conductive, transparent coating are de-coated. These de-coated regions form a so-called "communication window" or "data transmission window" and are known, for example, from EP 1 605 729 A2.

Since the transparent, electrically conductive coatings affect the coloring and reflectance of a pane, communications windows are optically very conspicuous. Disruptions in the drivers field of view, which impair driving safety and which must absolutely be avoided, can result from de-coated regions. Consequently, communication windows are arranged at inconspicuous positions on the pane, for example, in the region of the inside rearview mirror of a windshield, and covered by black imprints and plastic panels.

Such communication windows are too small to enable the transmitting and receiving of high-frequency electromagnetic radiation, such as is necessary, for example, for mobile telephony and satellite-supported navigation (GPS). This is true in particular when the necessary antenna is arranged far from the pane and only little signal intensity can reach into the receiving region of the antenna through the small communication window or only little signal intensity can be transmitted outward through the communication window. However, the user expects to be able to operate mobile telephones at any position in the interior of a vehicle.

From EP 0 717 459 A1, US 2003/0080909 A1, and DE 198 17 712 C1, panes with a metallic coating are known, all of which have grid-formed de-coating of the metallic coating. The grid-formed de-coating acts as a low pass filter for incident high-frequency electromagnetic radiation. The distances between the grid elements are small compared to the wavelength of the high-frequency electromagnetic radiation and thus a relatively large proportion of the coating is patterned and vision through the pane is relatively greatly impaired. The de-coating of a relatively large proportion of the layer is tedious and cost intensive. Moreover, such panes are not electrically heatable, since no current paths that could heat the metallic coating could be formed through the grid-formed de-coating.

The object of the present invention now consists in providing a pane with a transparent, electrically conductive coating, which pane is electrically heatable and which enables adequate transmission of high-frequency electromagnetic radiation, in particular for the operation of satellite-supported navigation (GPS) as well as mobile telephony in the bands GSM 900 and DCS 1800, UMTS, and LTE, which is optically appealing and which does not substantially restrict vision through the pane, and which can be economically produced. These and other objects are accomplished according to the proposal of the invention by a pane and a pane arrangement with the characteristics of the independent claims. Advantageous embodiments of the invention are indicated by the characteristics of the subclaims.

A method for producing a heatable pane with high-frequency transmission as well as the use of such a pane are evident from other independent claims.

A pane according to the invention comprises at least one first pane with an outer face and an inner face, at least one transparent, electrically conductive coating, which is arranged on the outer face and/or the inner face of the first pane, and at least two busbars provided for connection to a voltage source, which are connected to the transparent, electrically conductive coating such that a current path for a heating current is formed between the busbars.

Furthermore, the pane according to the invention comprises at least one region with at least two rows of de-coated structures. Here, the term "de-coated structure" means a section of the transparent, electrically conductive coating in which the coating is not present or is removed. The term "row" preferably means the totality of immediately adjacent de-coated structures, which are arranged substantially orthogonal to the direction of the current path. In particular, the baseline, i.e., the line which, for example, connects the lowest point or the lowest line of the de-coated structures, is arranged orthogonal or substantially orthogonal to the direction of the current path. The term "substantially orthogonal" means, in the context of the present invention, that the maximum angle between the above-mentioned line and the direction of the current path is on average between 60° and 120°, preferably between 75° and 105°, and particularly preferably between 85° and 95°.

The de-coated structure is completely bordered by the transparent electrically conductive coating. In other words, multiple de-coated structures are not connected to each other by additional de-coatings. This has the particular advantage that the heating current can flow around the de-coated structures and forms a heating area in the transparent, electrically conductive coating.

The de-coated structure has a length a and a width w, wherein the length a is greater than the width w and the length a is arranged substantially parallel to the direction of the current path.

In an alternative embodiment of the invention, the longitudinal direction of the de-coated structure is arranged substantially parallel to the direction of the shortest distance between the busbars.

In another alternative embodiment of the invention, the longitudinal direction of the de-coated structure is aligned substantially parallel to the direction of a current path, as it would run through the same pane, but without regions with de-coated structures.

In the context of the present invention, the term "substantially parallel" means that the maximum angle $\gamma$ between the longitudinal direction of the de-coated structure and the direction of the current path is on average less than or equal to 30°, preferably less than or equal to 15°, and particularly preferably less than or equal to 5°. Ideally, the longitudinal direction is aligned parallel to the direction of the current path, since this least deflects the heating current and yields a very homogeneous heating power distribution. This has the advantage that then the influence on the overall performance is minimal. Deviations from the direction of the current path can be necessary for reasons of aesthetics or for reasons of the desired diversion of the current path to the small extent described (≤30°) and are, in particular, locally necessary in the immediate vicinity of the de-coated structure.

In an advantageous embodiment of the invention, the transparent, electrically conductive coating has at least three regions with de-coated structures, wherein the regions are arranged adjacent one another, and preferably immediately adjacent one another, and along the current path or along the direction of the shortest distance between the busbars. In other words, there is at least one first region, a central region adjacent thereto, and a third region adjacent thereto. Preferably, each region has at least two rows of de-coated structures. A region is preferably defined by the area that includes all rows of a region.

In an advantageous embodiment of the invention, the de-coated structures are rows arranged substantially orthogonal to the direction of the current path or to the direction of the shortest distance between the busbars.

In an advantageous embodiment of the pane according to the invention, the ratio of length a to width w is greater than 5:1, preferably greater than 10:1, and in particular from 150:1 to 25:1. The length a is highly dependent on the wavelength, whereas the width w is selected as small as possible in order to minimize the influence on the current flow and the homogeneous heating power distribution and as large as necessary to enable a desired and adequate transmission.

In an advantageous embodiment of the pane according to the invention, the ratio of distance b to the width w is from 3:1 to 20:1, preferably from 5:1 to 10:1. For smaller ratios, there is very poor and non-homogeneous heatability of the pane. For larger ratios, the transmission of high-frequency electromagnetic radiation is only inadequate. The range around 7:1 is particularly advantageous.

The pane according to the invention can be implemented as a single pane composed of a first pane with a transparent, electrically conductive coating. Alternatively, the pane according to the invention can be implemented as a laminated pane. A laminated pane according to the invention preferably comprises a first pane, an intermediate layer, and a second pane as well as at least one transparent, electrically conductive coating, which is arranged between the intermediate layer and the first pane and/or between the intermediate layer and the second pane. The transparent, electrically conductive coating can also be arranged on a carrier film, which is preferably laminated in via additional intermediate layers within the first and the second pane.

The first pane and/or the second pane can be, both in the case of the single pane and also in the case of the laminated pane, a single pane or an already laminated pane composed of two or more panes, which form a fixedly bonded unit as a result of the lamination.

Another aspect of the invention comprises a pane arrangement with at least one pane or one laminated pane and at least one transmitting and/or receiving unit with at least one transmitting and/or receiving region. The transmitting and/or receiving unit is, for example, a GPS receiver or a mobile telephone antenna for transmitting and receiving mobile telephone signals.

The transmitting and/or receiving unit is arranged at a distance d on one face of the pane or laminated pane and the transmitting or receiving region is aligned on the pane or laminated pane such that an incoming signal from the opposite side of the pane or laminated pane can be acquired or sent to the opposite side. With use of the pane arrangement in a vehicle and in particular as a windshield, the transmitting and/or receiving unit is arranged on the side of the pane facing the vehicle interior. In the context of the present invention, the term "signal" means high-frequency radiation that is transmitted and/or received by the transmitting and/or receiving unit.

The pane comprises at least a first region, a central region, and a third region. The central region is advantageously arranged such that the signal strikes the pane or laminated pane or exits it at a maximum angle of incidence $\alpha_{max,0}$ from 5° to 30°, preferably from 10° to 20°. Moreover, in the first and/or the third region, the amount of the angle of incidence $\alpha$ is greater than the maximum angle of incidence $\alpha_{max,0}$. The angle of incidence $\alpha$ is determined there in the plane that is formed by the normal direction on the pane or laminated pane and the direction of the current path.

In an advantageous embodiment of the invention, the distance d is greater than or equal to 80 mm and preferably from 80 mm to 750 mm. The advantage of the solution according to the invention is particularly great in this distance d, since this results in the best possible coverage of the area by the at least three regions, which area results from the opening angle of the transmitting and/or receiving unit (i.e., the half width of the corresponding directional diagram) of 60° to 150° and preferably of 100° to 140° on the pane such that the maximum signal input can be acquired or transmitted through the pane.

The area of the regions and the area on which the transmitting and/or receiving region intersects the pane, preferably coincide more than 70%, particularly preferably more than 90%. In particular, the two areas are approximately congruent.

Another aspect of the invention comprises a pane with at least one pane or one laminated pane, wherein at least one transmitting and/or receiving unit can be arranged at a distance d on one face of the pane or laminated pane and the transmitting or receiving region can be aligned on the pane or laminated pane such that an incoming signal from the opposite side of the pane or laminated pane can be acquired or transmitted to the opposite side.

A pane according to the prior art with a transparent, electrically conductive coating attenuates incoming high-frequency electromagnetic radiation by −15 dB to −45 dB. In other words, the transmission is decreased by a factor of 6 to 178. Transmitting and/or receiving units for transmitting and/or receiving high-frequency electromagnetic radiation such as mobile telephone transceivers or GPS receivers that are arranged in a motor vehicle near a windshield with such a transparent, electrically conductive coating, present only very limited functionality. The introduction of a communication window according to the prior art wherein the transparent, electromagnetic coating is completely de-coated in a small region or is de-coated in the form of a grid, only represents a satisfactory solution when the transmitting and/or receiving unit is arranged very near the windshield or directly thereon. The farther the transmitting and/or receiving unit is from the windshield, the larger the communication window and thus the de-coated region must be. Such communication windows are visually very conspicuous and are only accepted by the consumer with suitable concealment, for example, by a black imprint. Moreover, the region of the communication window is not heatable in a large area.

The present invention is now based on the discovery that a pane according to the invention with de-coated structures according to the invention and in particular with an aspect ratio of length to width greater than 5:1 has adequately high permeability for high-frequency electromagnetic radiation and the pane can, at the same time, still be adequately and homogeneously heated. In contrast to panes according to the prior art, it is unnecessary to de-coat the transparent, electrically conductive coating over large areas. De-coated structures with only a small line width, which do not substantially impair the optical vision through the pane and the aesthetic appearance of the pane, suffice. This can be further improved through the introduction of multiple regions with a different density of de-coated structures as a function of the angle of incidence of the signal on the pane. By means of a low-density of de-coated structures in the central region, the disruption of the vision of the driver or the passengers through the pane can be kept low. At the same time, the angle of incidence α is small and enough signal reaches the transmitting and/or receiving unit or passes outward. In the critical regions with large angles of incidence α of typically up to 70°, the density of the de-coated structures is clearly increased according to the invention and, thus, the transmission through these pane regions is increased. At the same time, these regions are of less significance for the optical vision through the pane and bother the driver or the passengers only to a small extent.

In an advantageous embodiment of the pane according to the invention, the proportion of the de-coated area to the total area in the central region is less than the proportion of the de-coated area to the total area in the other regions. In the case of panes with more than three regions, the proportion of the de-coated area to the total area advantageously increases with increasing distance from the central region.

In an advantageous embodiment of the invention, the de-coated structure has the form of a full-surface de-coated rectangle or a de-coated rectangular frame. With these forms, it was possible to obtain particularly high permeabilities for high-frequency electromagnetic radiation with simultaneous high heating power and great homogeneity of the heating field. When the de-coated structure has the shape of a rectangular frame, the de-coated structure is advantageously completely rimmed by the transparent electrically conductive coating near its outer edge also on its inner edge and particularly preferably completely filled with the transparent electrically conductive coating. With such de-coated structures, it was possible to obtain particularly high permeabilities for high-frequency electromagnetic radiation with only small patterning effort. At the same time, the processing time and the processing costs can be kept low.

In an advantageous embodiment of the pane according to the invention, the periodicity between the de-coated structures is from 4 mm to 20 mm, preferably from 5 mm to 10 mm. The periodicity describes the distance b with which the de-coated structures in a row repeat.

The distance b particularly influences the transmission and can be optimized for the frequency for which the pane is intended to have optimum transmission. The distance b is preferably the horizontal or vertical minimum distance between two de-coated structures. For distances b of less than 1 mm, a strong coupling between the de-coated structures can occur, resulting in an undesirable increase in transmission attenuation.

In another advantageous embodiment, the de-coated structures according to the invention have a line width d of 0.025 mm to 0.3 mm and preferably of 0.03 mm to 0.14 mm. Such line widths are technically simple to produce, for example, by laser patterning. Moreover, they have little negative impact on the optical vision through the pane.

In an advantageous embodiment of the invention, the minimum distance h between two adjacent rows with de-coated structures within a region is from 2 mm to 150 mm. In an advantageous improvement of the invention, the distance $h_0$ in the central region is from 35 mm to 120 mm and particularly preferably from 70 mm to 100 mm, and the distance $h_1$, $h_{1'}$ in the other regions is from 2 mm to 20 mm and particularly preferably from 3 mm to 10 mm. The minimum distance h depends on the frequency for which the pane is intended to have optimum transmission. At the same time, it is crucial for the proportion of the de-coated area of a region relative to its entire surface and, thus, for the undisturbed optical vision through the pane. The minimum distance h is preferably the horizontal or vertical distance between two adjacent regions. For minimum distances h of less than 2 mm, a strong coupling between the de-coated structures can occur, resulting in an undesirable increase in transmission attenuation.

The length a of the de-coated structures is preferably from 8 mm to 150 mm. The length a is adapted to the frequency band or the frequency bands for which the pane is intended to have the least possible transmission attenuation. Furthermore, the length a depends on the sheet resistance of the transparent, electrically conductive coating and the effective relative permittivity $\varepsilon_{eff}$ of the panes and of the intermediate layer.

For mobile telephony operation in the GSM 900 band, the length a is preferably from 35 mm to 120 mm and particularly preferably from 40 mm to 90 mm. In the region of 1.8 GHz, the length a with low transmission attenuation is preferably from 20 mm to 70 mm. The optimum length a with low transmission attenuation with adequate bandwidth can be determined by the person skilled in the art in the context of simple simulations and experiments.

For reception of GPS signals for satellite-supported navigation, the length a is preferably from 35 mm to 120 mm and particularly preferably from 40 mm to 60 mm. In the region of 1.5 GHz, the length a with low transmission attenuation is preferably from 40 mm to 60 mm. The optimum length a with low transmission attenuation with adequate bandwidth can be determined by the person skilled in the art in the context of simple simulations and experiments.

In another preferred embodiment, the length a of the de-coated structures, disregarding the sheet resistance, is from $\lambda/(7*\sqrt{\varepsilon_{eff}})$ to $(3*\lambda)/(2*\sqrt{\varepsilon_{eff}})$, where λ indicates the wavelength for which the transmission is intended to be optimized. The length a is preferably roughly $\lambda/(4*\sqrt{\varepsilon_{eff}})$. As investigations of the inventors revealed, structures with lengths a in this range have low transmission attenuation with adequate bandwidth.

In another advantageous embodiment of the pane according to the invention, the length $a_0$ of the de-coated structure in the central region is greater than the length $a_1$ in the first region and/or the length $a_{1'}$ in the third region. High-frequency electromagnetic radiation passes through the pane in the different regions at a different angle of incidence. The angle of incidence is small in the central region and is larger in the regions distant from the central region. The length $a_0$ can also be adapted for larger angles of incidence in the first or in the third region to the other excitation situation with shortened distances h and can be selected smaller or larger in the embodiment described.

Of course, the busbars can be arranged both horizontally and vertically and also in a different direction on the pane. Consequently, the longitudinal sides of the de-coated structures can also be arranged vertically, horizontally, or in different directions.

The pane preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. Suitable glass types are known, for example, from EP 0 847 965 B1.

The thickness of the pane can vary widely and thus be ideally adapted to the requirements of the individual case. Preferably, panes with the standard thicknesses from 1.0 mm to 25 mm and preferably from 1.4 mm to 2.1 mm are used. The size of the pane can vary widely and is governed by the size of the use according to the invention.

In an advantageous embodiment of the invention, the pane has dielectric properties and a relative permittivity from 2 to 8. A pane made of polymers preferably has a relative permittivity from 2 to 5. A pane made of glass preferably has a relative permittivity from 6 to 8 and in particular of roughly 7.

The pane can have any three-dimensional shape. Preferably, the three-dimensional shape has no shadow zones such that it can, for example, be coated by cathodic sputtering. Preferably, the pane is planar or slightly or greatly curved in one or more spatial directions. The pane can be colorless or colored.

In a preferred embodiment of the pane according to the invention as a laminated pane, at least one of the panes contains glass and at least one of the panes contains plastic. In particular, in the case of a use according to the invention as a vehicle window pane, the outer pane contains glass and the inner pane contains plastic.

The panes of the laminated pane are bonded to each other via at least one intermediate layer. The intermediate layer preferably contains a thermoplastic plastic, such as polyvinyl butyral (PVB), ethylene vinyl acetate (EVA), polyurethane (PU), polyethylene terephthalate (PET), or a plurality of layers thereof, preferably with thicknesses from 0.3 mm to 0.9 mm.

The transparent, electrically conductive coating according to the invention is permeable to electromagnetic radiation, preferably electromagnetic radiation of a wavelength from 300 to 1,300 nm, in particular to visible light. The term "permeable" means that the total transmittance of the laminated pane complies with the legal requirements for windshields and front side windows and is permeable in particular to visible light preferably >70% and in particular >75%. For rear side windows and rear windows "permeable" can also mean 10% to 70% light transmittance.

The transparent, electrically conductive coating is preferably a functional coating, particularly preferably a functional coating with anti-sunlight protection. A coating with anti-sunlight protection has reflecting properties in the infrared range and thus in the range of sunlight. Thus, the heating of the interior of a vehicle or building as a result of sunlight is advantageously reduced. Such coatings are known to the person skilled in the art and typically contain at least one metal, in particular silver or a silver-containing alloy. The transparent, electrically conductive coating can include a sequence of a plurality of individual layers, in particular at least one metallic layer and dielectric layers that include, for example, at least one metal oxide. The metal oxide preferably contains zinc oxide, tin oxide, indium oxide, titanium oxide, silicon oxide, aluminum oxide, or the like, as well as combinations of one or a plurality thereof. The dielectric material can also contain silicon nitride, silicon carbide, or aluminum nitride.

This layer structure is generally obtained by a sequence of deposition procedures that are performed by a vacuum method, such as magnetic field enhanced cathodic sputtering. Very fine metal layers, which contain, in particular, titanium or niobium, can also be provided on both sides of the silver layer. The lower metal layer serves as an adhesion and crystallization layer. The upper metal layer serves as a protective and getter layer to prevent a change in the silver during the other process steps.

Particularly suitable transparent, electrically conductive coatings include at least one metal, preferably silver, nickel, chromium, niobium, tin, titanium, copper, palladium, zinc, gold, cadmium, aluminum, silicon, tungsten, or alloys thereof, and/or at least one metal oxide layer, preferably tin-doped indium oxide (ITO), aluminum-doped zinc oxide (AZO), fluorine-doped tin oxide (FTO, $SnO_2$:F), antimony-doped tin oxide (ATO, $SnO_2$:Sb), and/or carbon nanotubes and/or optically transparent, electrically conductive polymers, preferably poly(3,4-ethylenedioxythiophenes), polystyrene sulfonate, poly(4,4-dioctylcylopentadithiophene), 2,3-dichloro-5,6-dicyano-1,4-benzoquinone, mixtures, and/or copolymers thereof.

The thickness of the transparent, electrically conductive coating can vary widely and can be adapted to the requirements of the individual case. It is essential that the thickness of the transparent, electrically conductive coating not be so great that it becomes impermeable to electromagnetic radiation, preferably electromagnetic radiation of a wavelength from 300 to 1,300 nm and in particular visible light. The transparent, electrically conductive coating preferably has a layer thickness from 10 nm to 5 μm and particularly preferably from 30 nm to 1 μm.

The sheet resistance of the transparent, electrically conductive coating is preferably from 0.35 ohm/square to 200 ohm/square, preferably 0.5 ohm/square to 200 ohm/square, most particularly preferably from 0.6 ohm/square to 30 ohm/square, and, in particular, from 2 ohm/square to 20 ohm/square. The transparent, electrically conductive coating can, in principle, have even lower sheet resistances than 0.35 ohm/square, in particular if, in its use, only a low light transmittance is required. The transparent, electrically conductive coating preferably has good infrared reflecting properties and/or particularly low emissivity (low-E).

In an advantageous embodiment of the laminated pane according to the invention, at least one transparent, electrically conductive layer is situated on at least one of the inner faces of the panes. In the case of a pane composite made of two panes, a transparent, electrically conductive layer can be situated on the inner face of one or the other pane. Alternatively, a transparent, electrically conductive layer can, in each case, be situated on each of the two inner faces. In the case of a pane composite made of more than two panes, multiple transparent, electrically conductive coatings can also be situated on multiple inner faces of the panes. In that case, the regions with de-coated structures are preferably arranged congruently in the different coatings in order to ensure low transmission attenuation.

Alternatively, a transparent, electrically conductive coating can be embedded between two thermoplastic intermediate layers. In that case, the transparent, electrically conductive coating is preferably applied on a carrier film or carrier pane. The carrier film or carrier pane preferably contains a polymer, in particular polyvinyl butyral (PVB), ethylene vinyl acetate (EVA), polyurethane (PU), polyethylene terephthalate (PET), or combinations thereof.

In an alternative embodiment of the invention, the transparent, electrically conductive layer or a carrier film with the transparent, electrically conductive layer is arranged on one face of a single pane.

The invention includes a method for producing a pane according to the invention as described above, wherein at least:
(a) the transparent, electrically conductive coating is applied on the outer face and/or the inner face of a first pane, and
(b) at least three regions with at least two rows of de-coated structures are introduced into the transparent, electrically conductive coating.

In an alternative embodiment of the method according to the invention, the transparent, electrically conductive coating can be applied on a carrier film, for example, a PET film. The carrier film can be bonded to the first pane directly or via at least one intermediate layer. The region with the de-coated structures can be introduced into the transparent, electrically conductive coating before or after the bonding to the first pane.

Application of the transparent, electrically conductive coating in process step (a) can be done using methods known per se, preferably by magnetic field enhanced cathodic sputtering. This is particularly advantageous with regard to simple, rapid, economical, and uniform coating of the first pane. The transparent, electrically conductive coating can, however, also be applied, for example, by vapor deposition, chemical vapor deposition (CVD), plasma enhanced chemical vapor deposition (PECVD), or by wet chemical methods.

The first pane can be subjected to a temperature treatment after process step (a). The first pane with the electrically conductive coating is heated to a temperature of at least 200° C., preferably at least 300° C. The temperature treatment can serve to increase transmittance and/or to reduce the sheet resistance of the transparent, electrically conductive coating.

The first pane can be bent after process step (a), typically at a temperature from 500° C. to 700° C. Since it is technically simpler to coat a flat pane, this approach is advantageous when the first pane is to be bent. Alternatively, the first pane can, however, also be bent before process step (a), for example, if the transparent, electrically conductive coating is unsuitable to withstand a bending process without damage.

The de-coating of the de-coated structures in the transparent, electrically conductive coating is preferably done by a laser beam. Methods for patterning thin metal films are known, for example, from EP 2 200 097 A1 or EP 2 139 049 A1. The width of the de-coating is preferably 10 μm to 1000 μm, particularly preferably 25 μm to 300 μm, and in particular 70 μm to 140 μm. In this range, a particularly clean and residue-free de-coating takes place using the laser beam. The de-coating by means of laser beam is particularly advantageous since the de-coated lines are optically very unobtrusive and the appearance and the vision through the pane is impaired only little. The de-coating of a line of the width d, which is wider than the width of a laser cut, is done by multiple passes of the line with the laser beam. Consequently, process duration and process costs rise with an increasing line width. Alternatively, the de-coating can be done by mechanical ablation as well as by chemical or physical etching.

An advantageous improvement of the method according to the invention includes at least the following additional steps:
(c) Arranging a thermoplastic intermediate layer on the first pane and arranging a second pane on the thermoplastic intermediate layer, and
(d) Bonding the first pane and the second pane via the thermoplastic intermediate layer.

In process step (c), the first pane is advantageously arranged such that the one of its surfaces that is provided with the electrically conductive coating faces the intermediate layer. This has the particular advantage that the transparent, electrically conductive coating is protected, by lamination, against environmental influences and against touching by the user.

The thermoplastic intermediate layer can be implemented by a single thermoplastic film or even by two or more thermoplastic films that are arranged areally one over another.

The bonding of the first and second pane in process step (d) is preferably done under the action of heat, vacuum, and/or pressure. Methods known per se for producing a pane can be used.

For example, so-called autoclave methods can be performed at an elevated pressure of roughly 10 bar to 15 bar and temperatures from 130° C. to 145° C. over roughly 2 hours. Vacuum bag or vacuum ring methods known per se operate, for example, at roughly 200 mbar and 80° C. to 110° C. The first pane, the thermoplastic intermediate layer, and the second pane can also be pressed in a calender between at least one pair of rollers to form a pane. Facilities of this type for producing panes are known and usually have at least one heating tunnel upstream from a pressing system. During the pressing procedure, the temperature is, for example, from 40° C. to 150° C. Combinations of calender and autoclave methods have proved particularly effective in practice. Alternatively, vacuum laminators can be used. These consist of one or a plurality of heatable and evacuable chambers in which the first pane and the second pane are laminated within, for example, roughly 60 minutes at reduced pressures from 0.01 mbar to 800 mbar and temperatures from 80° C. to 170° C.

To produce a bent laminated pane, the first pane and the second pane can be bent, before the process step (c), in a hot bending process known per se. The first and the second pane can advantageously be bent together such that an identical curvature of the panes is ensured.

The invention further extends to the use of a pane as described above in a vehicle body or in a vehicle door of a means of transportation on land, on water, or in the air, in buildings as part of an external façade or as building windows and/or as a built-in part in furniture and appliances.

The use of a pane according to the invention as a windshield is particularly advantageous. In cities, the mobile telephone transmission stations are customarily installed on roofs or elevated positions and beam down from above. Satellite navigation signals likewise beam down from above on a vehicle. The high-frequency, electromagnetic radiation can then arrive in the driving direction from the front through the windshield according to the invention into the interior of the motor vehicle. Since, to improve aerodynamics, windshields have a sharply inclined installed position, mobile telephone signals or satellite navigation signals can enter the vehicle interior, in particular from above, through the pane according to the invention.

Figure 2:
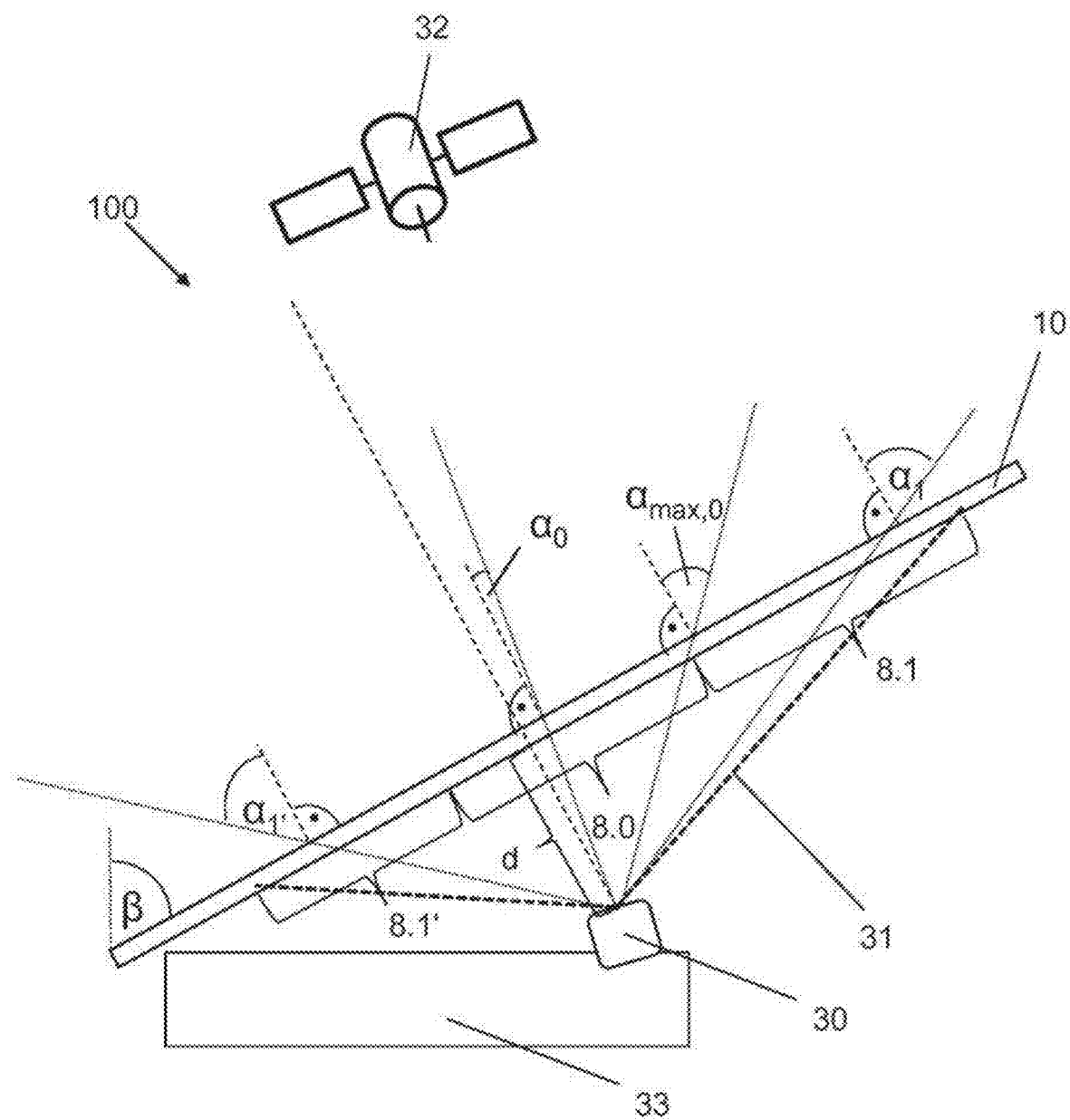
Figure 3A:
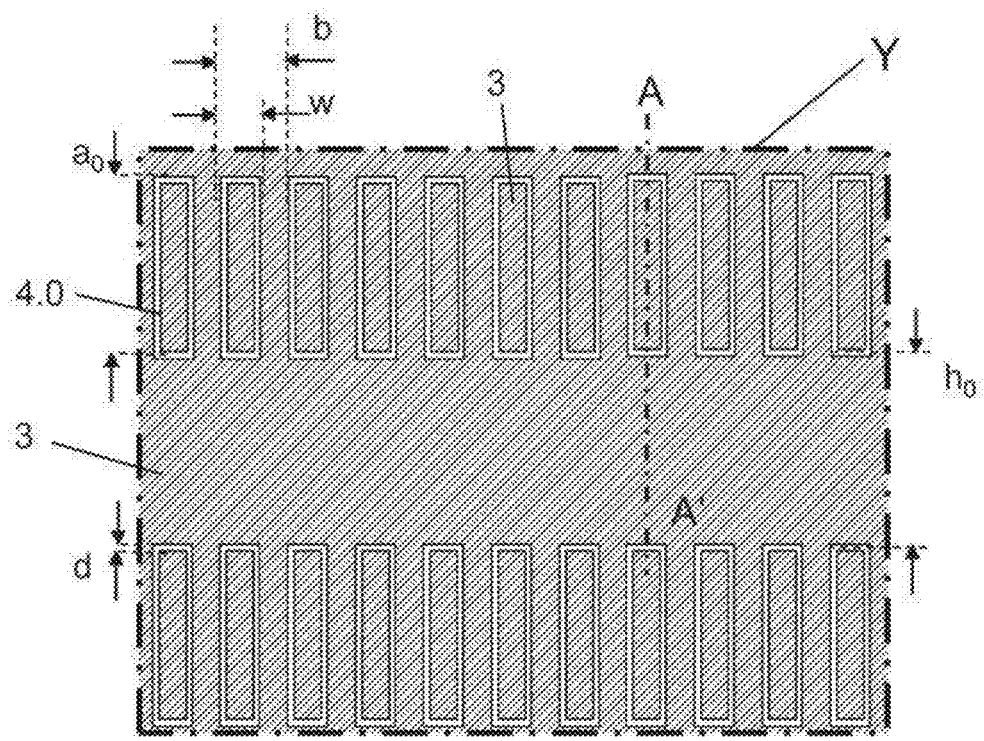
Figure 3B:
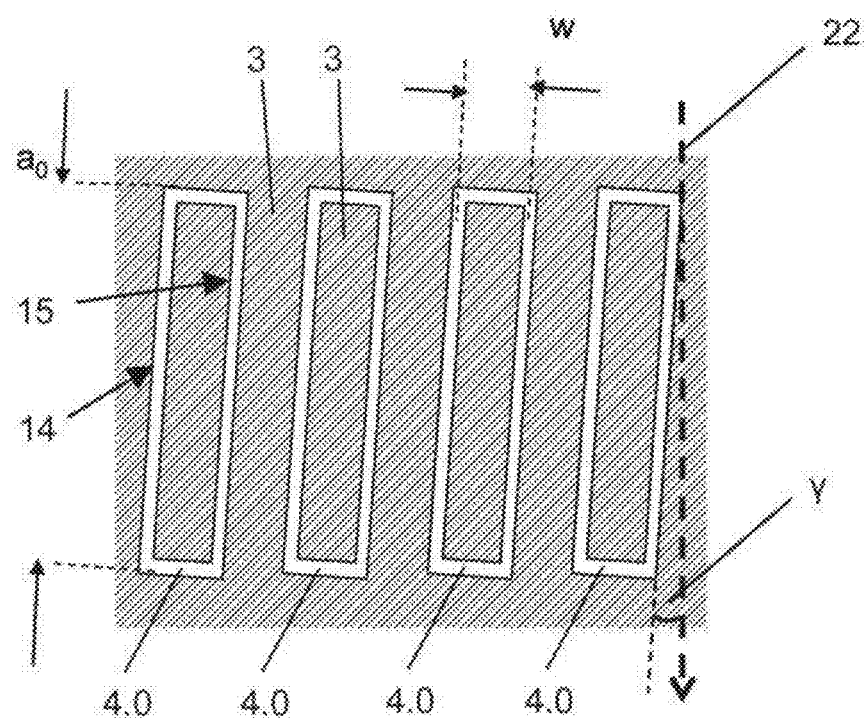
Figure 3C:
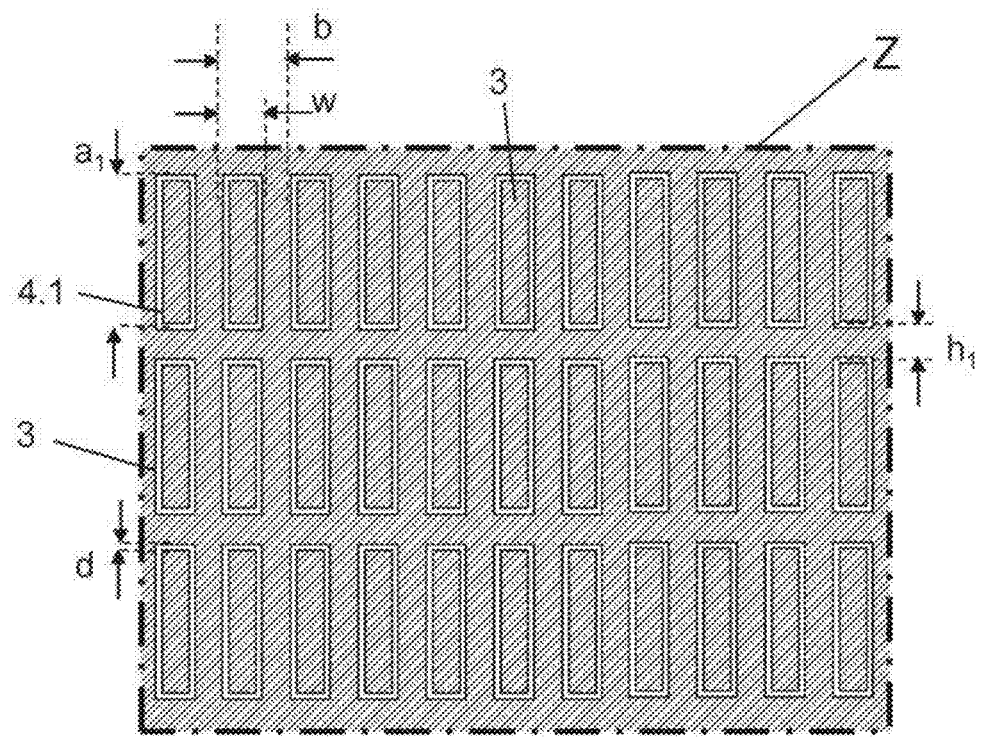
Figure 3D:
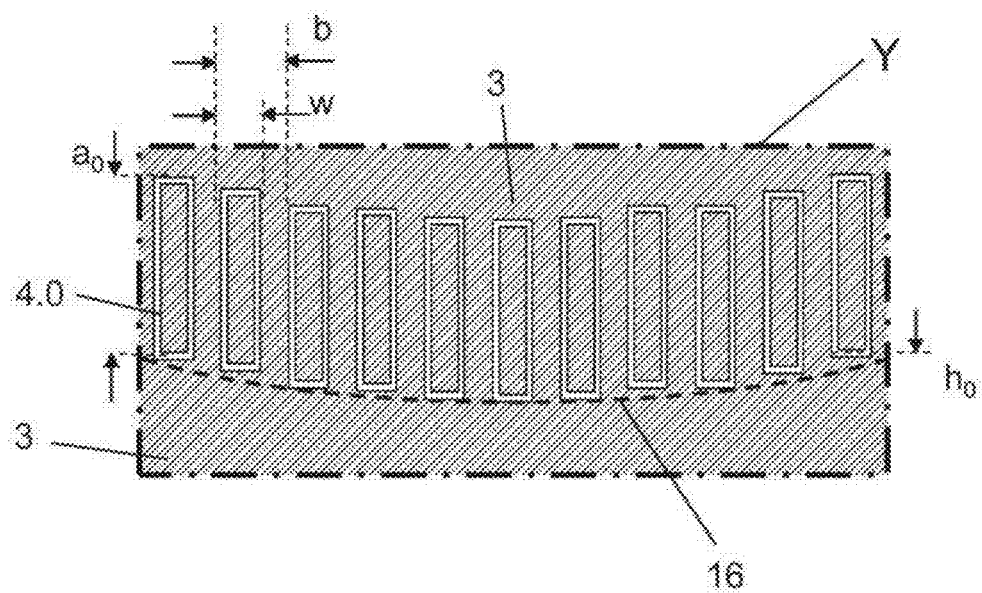
Figure 4:
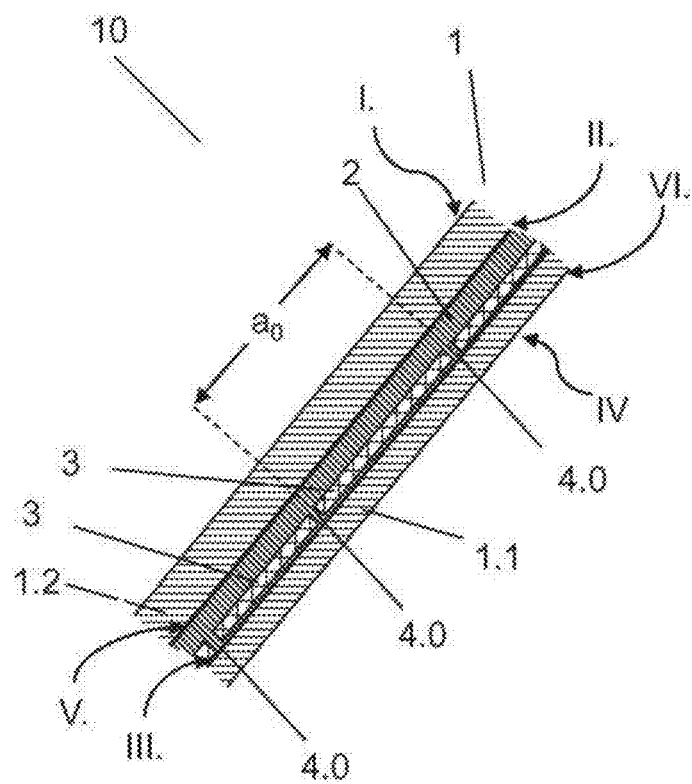
Figure 5:
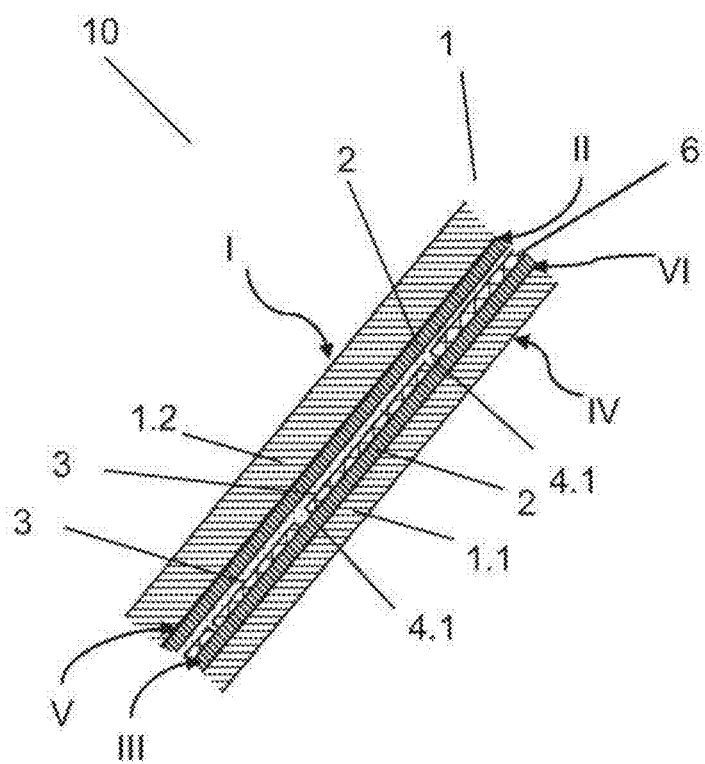
Figure 6:
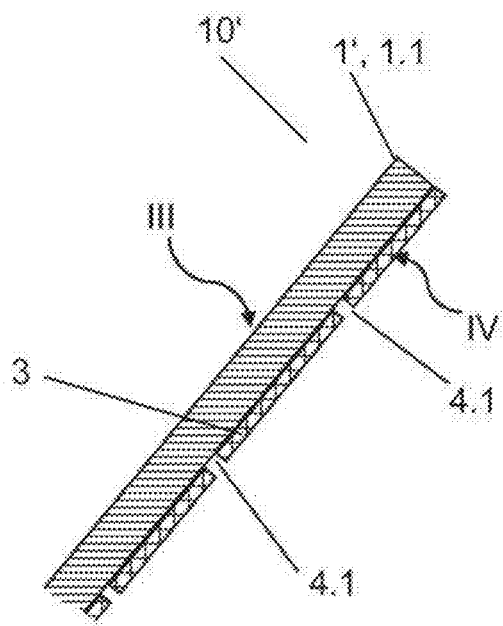
Figure 7A:
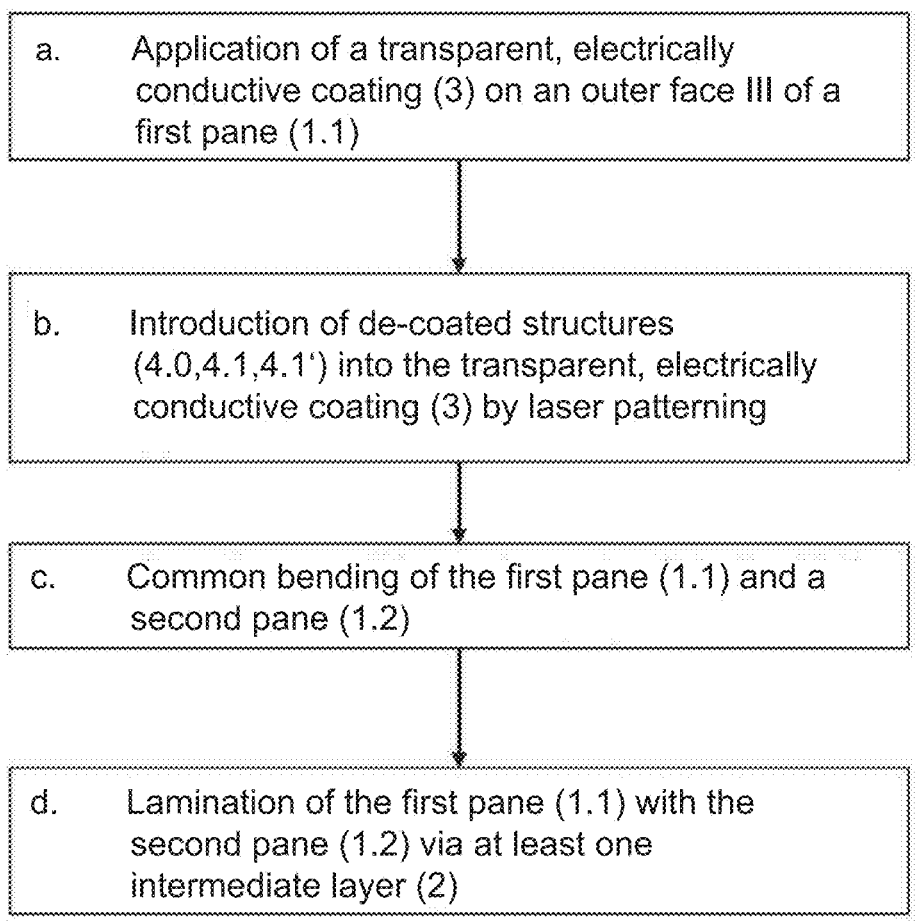
Figure 7B:
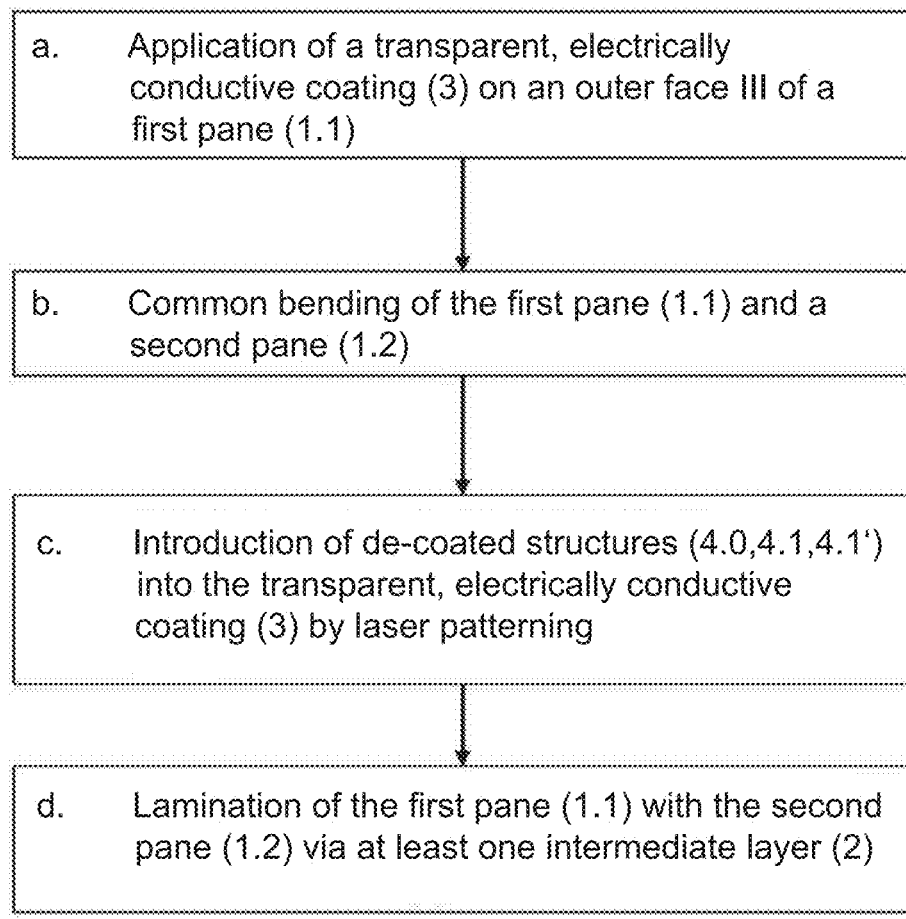
Figure 8:
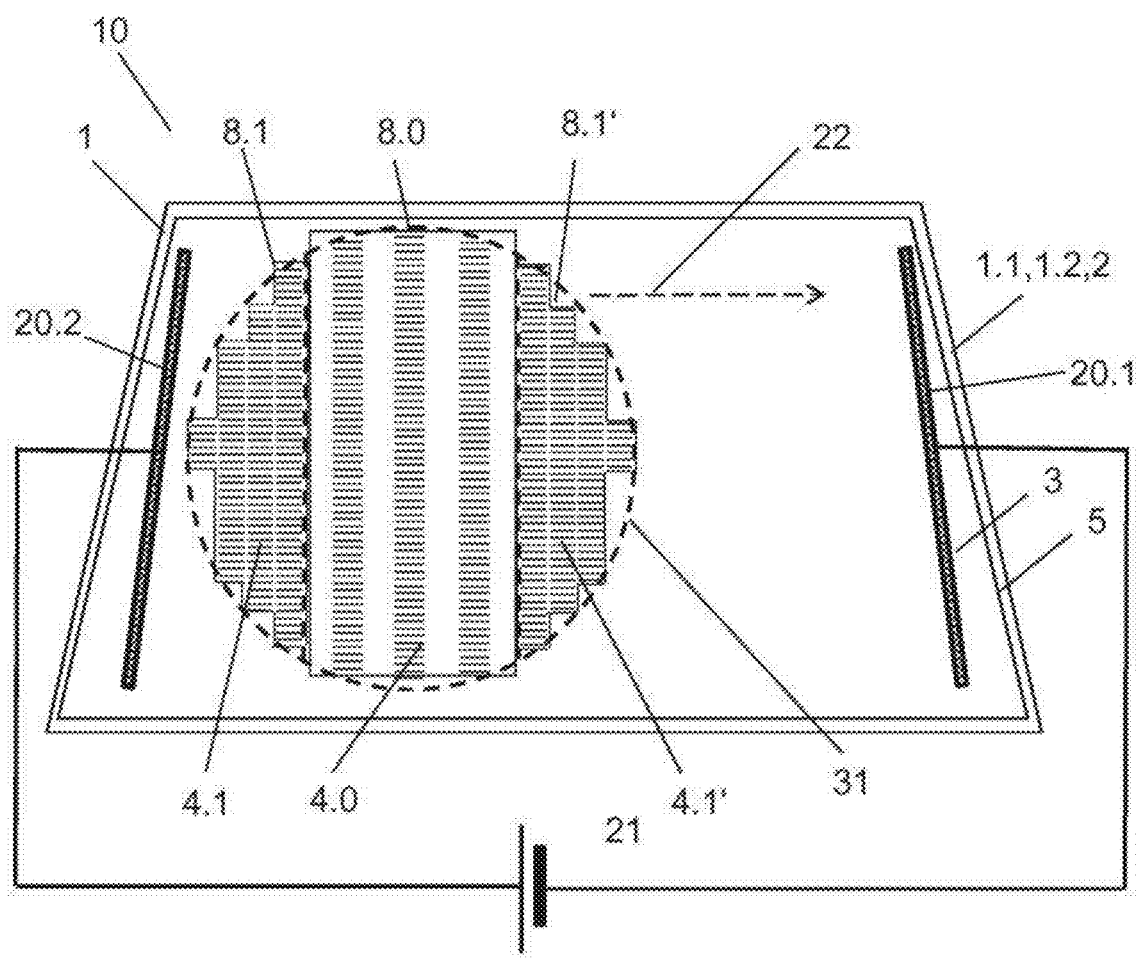

The invention is explained in detail in the following with reference to drawings and an example. The drawings are not completely true to scale. The invention is in no way restricted by the drawings. They depict:

FIG. 1 a schematic representation of a pane according to the invention in plan view, FIG. 2 a cross-sectional representation along the section line B-B' of FIG. 1, FIG. 3A an enlarged representation of the detail Y of the pane according to the invention of FIG. 1, FIG. 3B an enlarged representation of a detail of the pane according to the invention of FIG. 3A, FIG. 3C an enlarged representation of the detail Z of the pane according to the invention of FIG. 1, FIG. 3D an enlarged representation of a detail of an alternative pane according to the invention, FIG. 4 a cross-sectional representation along the section line A-A' of FIG. 3A, FIG. 5 a cross-sectional representation along the section line A-A' of FIG. 3A of an alternative exemplary embodiment of a pane according to the invention, FIG. 6 a cross-sectional representation along the section line A-A' of FIG. 3A of another alternative exemplary embodiment of a pane according to the invention, FIG. 7A a flowchart of an exemplary embodiment of the method according to the invention, FIG. 7B a flowchart of an alternative exemplary embodiment of the method according to the invention, and FIG. 8 a schematic representation of an alternative exemplary embodiment of a pane according to the invention in plan view.

FIG. 1 depicts a schematic representation of a pane 10 according to the invention. Here, the pane 10 is, for example, a motor vehicle windshield in plan view on face IV, in other words, on the face of the pane 10 facing the driver and the vehicle interior.

The pane 10 comprises a first pane 1.1 on whose outer face III a transparent electrically conductive coating 3 is arranged. Along the lower pane edge, a busbar 20.1 is arranged on the transparent electrically conductive coating 3 and is electrically conductively connected thereto. Along the upper pane edge, another busbar 20.2 is arranged on the transparent electrically conductive coating 3 and is likewise electrically conductively connected thereto. The busbars 20.1 and 20.2 are known per se and consist, for example, of a metal strip or a printed-on electrically conductive silver print. The two busbars 20.1 and 20.2 are in each case, for example, centrally connected to a connector by means of which the busbars 20.1 and 20.2 are connected to a voltage source 21 via feed lines. The voltage source 21 is, for example, an onboard power system of a motor vehicle or connected via voltage converters to an onboard power system of a motor vehicle. The application of a voltage to the busbars 20.1 and 20.2 results in the formation of a heating current which heats the transparent electrically conductive coating 3 by means of ohmic-resistance heating. The resultant current path 22 is indicated, for example, by an arrow. It runs substantially along the shortest connection between the busbars 20.1 and 20.2. In the case of complex pane geometries, with more than two busbars, and taking into account the intrinsic ohmic resistance of the busbars 20.1 and 20.2, the current path 22 can be curved. The precise actual current paths can be readily determined by the person skilled in the art, for example, through simulations.

FIG. 2 depicts a pane arrangement 100 according to the invention. The pane arrangement 100 includes, for example, a pane 10 according to the invention, as was described in detail in FIG. 1. The pane 10 is, for example, installed as a windshield in a motor vehicle. The installation angle β, at which the pane 10 is installed relative to the vertical, is preferably from 50° to 65° and, for example, 60°. The dashboard 33 is arranged below the pane 10. Above the dashboard 33, a transmitting and/or receiving unit 30 is arranged, here, for example, a GPS receiver to receive signals from satellites 32 for satellite-supported navigation. The distance d of the transmitting and/or receiving unit 30 from the pane 10 is, for example, 50 cm. The transmitting and/or receiving region 31 of the transmitting and/or receiving unit 30 is oriented toward the pane 10 and is, in this example, cone-shaped such that the transmitting and/or receiving region 31 intersects the pane 10 in the shape of the circle or an ellipse. For optimum utilization of the transmitting and/or receiving region 31, the transmitting and/or receiving region 31 is substantially congruent with the regions 8.1,8.0,8.1', which have the de-coated structures 4.1,4.0,4.1'.

The signals that are transmitted by satellites 32 strike the pane 10 at an angle of incidence $\alpha_{1'},\alpha_0,\alpha_1$. The angle of incidence $\alpha_{1'},\alpha_0,\alpha_1$ is determined in the plane that is formed by the direction perpendicular to the pane 10 and the direction of the current path 22. Alternatively, the angle of incidence $\alpha_{1'},\alpha_0,\alpha_1$ can be determined in the plane that is formed by the direction perpendicular to the pane 10 and the direction of the shortest connection between the busbars 20.1 and 20.2. The center region 8.0 is arranged such that the maximum angle of incidence $\alpha_{max,0}$, for example, on the transition of the region 8.0 to the region 8.1 is 17°, and on the transition of the region 8.0 to the region 8.1' is 17°. The result is that the amount of the angle of incidence $\alpha_{1'}$ is greater than 17° and the amount of the angle of incidence $\alpha_1$ is greater than 17°. Of course, the maximum angle of incidence $\alpha_{max,0}$ on the transition from the region 8.0 to the region 8.1 does not have to be equal to the maximum angle of incidence $\alpha_{max,0}$ on the transition from the region 8.0 to the region 8.1'.

FIG. 3A depicts an enlarged representation of the detail Y of the pane according to the invention of FIG. 1 in the central region 8.0. As already shown in FIG. 1, the transparent, electrically conductive coating 3 has, in the central region 8.0, for example, three rows 9 with de-coated structures 4.0. The de-coated structures 4.0 are, for example, implemented as de-coated rectangular frames and are, for example, de-coated by laser patterning.

The de-coated structure 4.0 is completely rimmed by the transparent, electrically conductive coating 3. In other words, the de-coated structure 4.0 is not connected to other de-coated structures or de-coated connection lines or de-coated areas. The de-coated structure 4.0 is completely surrounded on its outer edge 14 and on its inner edge 15 by the transparent, electrically conductive coating 3. By means of the de-coated structures 4.0, the transparent electrically conductive coating 3 otherwise impermeable to high-frequency electromagnetic radiation becomes permeable.

The de-coated structures 4.0 are, in this exemplary embodiment, optimized for the permeability of GPS-L1 signals for satellite-supported navigation with a frequency of 1.575 GHz. The length $a_0$ of the de-coated structures 4.0 is, for example, 55 mm. The width w of the de-coated structures 4.0 is, for example, 1 mm. The aspect ratio of the length $a_0$ to the width w is, for example, 55:1.

The periodicity b of the de-coated structures 4.0 with in a row 9 is preferably constant and is, for example, 7 mm. The distance $h_0$ between the rows 9 is, for example, 85 mm.

FIG. 3B depicts an enlarged representation of a detail of the pane according to the invention of FIG. 3A. The de-coated structures 4.0 are aligned substantially parallel to the direction of the current path 22. Here, "substantially" means that the maximum angle γ between the longitudinal direction of the de-coated structure 4.0 along the length $a_0$ and the direction of the current path 22 is, on average, less than 30°, preferably less than 15°, and particularly preferably less than 5°. Here, "on average" means that, thus, the deviation of the current path 22 can deviate locally from its overall direction directly above and below the de-coated structure 4.0. In the exemplary embodiments depicted here, the angle γ between the length a of the de-coated structures 4.0, 4.1, 4.1' is, on average, less than 5°.

FIG. 3C depicts an enlarged representation of the detail Z of the pane 10 according to the invention of FIG. 1 in the first region 8.1 running in the direction of the current path 22. Here, the first region 8.1 borders, for example, the upper busbar 20.2. The length $a_1$ of the de-coated structures 4.1 is, for example, 45 mm. The width w of the de-coated structures 4.1 is, for example, 1 mm and corresponds in this example to the width w of the de-coated structures 4.0. The aspect ratio of the length $a_1$ to the width w is, for example, 45:1. The periodicity b of the de-coated structures 4.1 within a row 9 is preferably constant and is, for example, 7 mm. The distance $h_1$ between the rows 9 is, for example, 5 mm.

The de-coated structures 4.1' in the region 8.1' correspond in their arrangement and in their dimensions to those of the first region 8.1 and the description for FIG. 3C. Of course, the de-coated structures 4.1' in the region 8.1' can also have other lengths $a_{1'}$, widths $w_{1'}$, distances $b_{1'}$, or distances $h_{1'}$.

The de-coated structures 4.0, 4.1, 4.1' are, for example, de-coated by laser patterning and have only a very low line width d of, for example, 0.1 mm.

The periodic distance b affects, in particular, the level of transmission permeability and the bandwidth for high-frequency electromagnetic radiation. Of course, the distance b does not have to be constant in all regions, but, rather, selected for the respective region such that the transmission through the pane 10 is optimized.

Optimization is done via the parameters length a, width w, the density of the de-coated structures resulting from the periodic distance b and the distance h, and the sheet resistance. The following table presents, for improved clarity, the respective parameters and their primary influencing factors:

|  | Transmission | Relative Bandwidth | Resonance Frequency |
| --- | --- | --- | --- |
| Length a |  |  | x |
| Width w | x | x |  |
| Structure density | x |  |  |
| Sheet resistance | x | x | x |

The length a is adapted to the high-frequency electromagnetic radiation having frequency f, for which the pane 10 is intended to be maximally permeable. The length a depends, for de-coated structures 4 in a first approximation using the formula $a = c/(4*f*(\varepsilon_{eff})^{0.5})$, on the effective relative permittivity $\varepsilon_{eff}$ of the pane 1.1,1.2 and of the intermediate layer 2, where c is the speed of light. Due to adjacently arranged rows 9 with de-coated structures 4, there can be interference of the rows 9 among each other and, thus, the formation of resonances and frequency shifts, which make adaptation and optimization of the length a, the width b, the vertical distance d, and the horizontal distance h necessary. These can be calculated using simulations familiar to the person skilled in the art.

The pane 10 of FIG. 2 was optimized for operation of satellite-supported navigation (GPS). Through variation of the parameters and, in particular, the length $a_0, a_1, a_{1'}$ of the de-coated structures 4.0, 4.1, 4.1', the pane 10 can be optimized in a simple manner for the transmission of different frequency bands or multiple frequency bands.

In FIGS. 3A, 3B, and 3C, the de-coated structures 4.0, 4.1, 4.1' of one row 9 are respectively arranged along a straight baseline. FIG. 3D depicts an enlarged representation of a detail of an alternative pane according to the invention, in which the de-coated structures 4.0, 4.1, 4.1' of one row 9 are respectively arranged along a curved baseline 16. The curvature of the baseline 16 preferably corresponds to the curvature of the lower or upper edge of the pane 10 or to the curvature of the lower busbar 20.1 or of the upper busbar 20.2.

FIG. 4 depicts a cross-sectional representation along the section line A-A' of FIG. 3A using the example of a laminated pane. The pane 10 is, without restricting the invention, optimized for the transmission of high-frequency electromagnetic radiation in the GPS band. The pane 10 comprises a laminated pane 1 composed of two individual panes, namely a rigid first pane 1.1 and a rigid second pane 1.2, which are fixedly bonded to each other via a thermoplastic intermediate layer 2. The individual panes 1.1,1.2 have roughly the same size and are manufactured, for example, of glass, in particular float glass, cast glass, and ceramic glass, being equally possibly produced from a nonglass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). In general, any material with adequate transparency, sufficient chemical resistance, as well as suitable shape and size stability can be used. For another type of use, for example, as a decorative part, it would also be possible to produce the first pane 1.1 and the second pane 1.2 from a flexible and/or a nontransparent material. The respective thickness of the first pane 1.1 and of the second pane 1.2 can vary widely depending on the use and can be, in the case of glass, for example, in the range from 1 to 24 mm. In the present example, the first pane 1.1 has a thickness of 2.1 mm; and the second pane 1.2, a thickness of 1.8 mm.

The pane faces are identified with the Roman numerals I-IV, where face I corresponds to the outer face of the second pane 1.2, face II to the inner face of the second pane 1.1, face III to the outer face of the first pane 1.1, and face IV to the inner face of the first pane 1.1 of the laminated pane 1. In the context of the present invention, "outer face" is the face of a pane that faces the exterior of the vehicle. "Inner face" is the face of a pane that faces the interior of the vehicle. In the use as a windshield, the face I faces the external environment and the face IV faces the passenger compartment of the motor vehicle. Of course, the face IV can also face outward and the face I can face the passenger compartment of the motor vehicle.

The intermediate layer 2 for the bonding of the first pane 1.1 and the second pane 1.2 preferably contains an adhesive plastic preferably based on polyvinyl butyral (PVB), ethylene vinyl acetate (EVA), or polyurethane (PU).

The laminated pane 1 is transparent to visible light, for example, in the wavelength range from 350 nm to 800 nm, with the term "transparency" understood to mean light permeability of more than 50%, preferably more than 70%, and in particular preferably more than 75%.

The relative permittivity of the panes 1.1,1.2 of the laminated pane 1 is, for panes made of float glass, from 6 to 8 and, for example, 7.

In the example presented, the transparent, electrically conductive coating 3 is applied on the face III of the inner first pane 1.1 facing the intermediate layer 2. The transparent, electrically conductive coating 3 serves as an electrically heatable coating. The transparent, electrically conductive coating 3 is known, for example, from EP 0 847 965 B1 and includes two silver layers that are embedded in each case between a plurality of metal and metal oxide layers. The transparent, electrically conductive coating 3 has a sheet resistance of roughly 1 ohm/square. The transparent, electrically conductive coating 3 can, for example, also act as an infrared reflecting layer. This means that the proportion of thermal radiation of incident sunlight is largely reflected. With the use of the laminated pane 1 in a vehicle, this provides for reduced heating of the interior through sunlight.

The transparent, electrically conductive coating 3 can, nevertheless, be arranged on the face II of the outer, second pane 1.2 facing the thermoplastic intermediate layer 2, or on the two interior pane faces II and III. The transparent, electrically conductive coating 3 can be arranged additionally or exclusively on one of the outer faces I and IV or both outer faces I and IV of the laminated pane 1.

The transparent, electrically conductive coating 3 is applied on the entire first pane 1.1, minus an edge de-coated region 5. The edge de-coating in the region 5 prevents a contact of the transparent, electrically conductive coating 3, which is advantageous with corrosion-sensitive coatings. Moreover, the second pane 1.2 is provided, for example, with an opaque ink layer that is applied on the face II and forms a frame-like peripheral masking strip, which is not shown in detail in the figures. The ink layer consists, preferably, of an electrically nonconductive black-colored material, which can be fired into the first pane 1.1 or the second pane 1.2. The masking strip prevents, on the one hand, seeing an adhesive strand with which the laminated pane 1 is glued into the vehicle body; on the other, it serves as UV protection for the adhesive material used.

FIG. 5 depicts a cross-sectional representation along the section line A-A' of FIG. 3A of an alternative exemplary embodiment of a pane 10 according to the invention with a laminated pane 1. In this exemplary embodiment, the first pane 1.1 and the second pane 1.2 are bonded to a three-ply intermediate layer. The three-ply intermediate layer includes a film 6, which contains, for example, polyethylene terephthalate (PET), and which is arranged between two layers 2 of an adhesive plastic, for example, polyvinyl butyral (PVB). The PET film is implemented here, for example, as a carrier of the transparent, electrically conductive coating 3.

FIG. 6 depicts a cross-sectional representation along the section line A-A' of FIG. 3A of an alternative exemplary embodiment of a pane 10 according to the invention with a single pane 1'. The transparent, electrically conductive coating 3 with the regions 9 with de-coated structures 4.1,4.2 is arranged on the inner face IV of the single pane 1' facing the vehicle interior. The shape and material of the single pane 1' correspond to the first pane 1.1 of FIG. 3A. The transparent, electrically conductive coating 3 and the regions 8.0,8.1,8.1' likewise correspond to the exemplary embodiment of FIG. 3A. Here, the transparent, electrically conductive coating 3 is, for example, a so-called "low-E" layer and has low emissivity for infrared radiation. The transparent, electrically conductive coating 3 contains or is made of, for example, an indium tin oxide (ITO) layer with a sheet resistance of 20 ohm/square. The indium tin oxide layer implemented inert relative to environmental influences and scratch resistant such that the indium tin oxide layer can be arranged on the surface of a side window of a motor vehicle facing a vehicle interior. Transparent, electrically conductive coatings 3 with such high sheet resistances can require correspondingly high operating voltages of more than 100 V for electrical heating, as are, for example, present in electric vehicles. For electrical safety and due to scratch and corrosion sensitivity, heatable transparent, electrically conductive coating 3 through which current flows can be protected by an insulating layer that contains, for example, a polymer film, such as polyethylene terephthalate (PET) or polyvinyl fluoride (PVF). Alternatively, the transparent, electrically conductive coating 3 can have an insulating and scratch resistant cover layer of inorganic oxides, such as silicon oxide, titanium oxide, tantalum pentoxide, or combinations thereof.

FIG. 7A depicts a flowchart of an exemplary embodiment of the method according to the invention for producing a pane 10 according to the invention. FIG. 7B depicts a flowchart of another variant of an exemplary embodiment of the method according to the invention for producing a pane 10 according to the invention. In contrast to FIG. 7A, in FIG. 7B, the first pane 1.1 and the second pane 1.2 are first bent and the de-coated structures 4.0,4.1,4.1' are introduced thereafter.

FIG. 8 depicts another exemplary embodiment of a pane 10 according to the invention. The busbars 20.1 and 20.2 are, in this example, arranged on the vertical faces of the pane 10. The heating current developing upon application of a voltage has a current path 22, which runs over the pane 10 horizontally, on average, in the transparent, electrically conductive coating 3. Since for adequate and homogeneous heating power, the longer side of the de-coated structures 4.0,4.1,4.1' with the length $a_0,a_1,a_1$. must be aligned substantially parallel to the direction of the current path 22, the regions 8.0,8.1,8.1' are arranged adjacent one another in the horizontal direction. The de-coated structures 4.0,4.1,4.1' are accordingly arranged with their longitudinal direction horizontal. The rows 9 are arranged here in a vertical direction. Otherwise, the pane 10 depicted in FIG. 8 corresponds to the pane 10 of FIG. 1.

The pane according to the invention 10 has significant advantages relative to panes according to the prior art. The pane according to the invention 10 is electrically heatable over the complete pane and nevertheless has adequately high transmission for electromagnetic radiation. The proportion of area de-coated by the de-coated structures 4.0 in the central field of view of the driver is reduced and enables good optical vision through the pane for the driver. By increasing the proportion of de-coated area in the edge regions of the pane 10 with large angles of incidence α, these regions 8.1,8.1' can also be effectively used for the transmission of high-frequency electromagnetic radiation and the total transmission of the pane can clearly be increased.

This result was unexpected and surprising for the person skilled in the art.

LIST OF REFERENCE CHARACTERS 1 laminated pane
1' single pane
1.1 first pane,
1.2 second pane
2 intermediate layer
3 transparent, electrically conductive coating
4,4.0,4.1,4.1' de-coated region, de-coated structure
5 edge de-coating
6 carrier film
8.0,8.1,8.1' region
9 row
10 pane
14 outer edge
15 inner edge
16 baseline of a row 9
20.1,20.2 busbar
21 voltage source
22 current path
30 transmitting and/or receiving unit
31 transmitting and/or receiving region
32 satellite
33 dashboard
100 pane arrangement
α angle of incidence, exit angle
β installation angle of the pane 10
γ angle between a de-coated structure 4 and current path 22
A-A' section line
B-B' section line
a, $a_0$, $a_1$, $a_{1'}$ length of a de-coated structure 4,4.0,4.1,4.1'
b periodic distance between two de-coated structures 4 in a row 9
d line width of a de-coated structure 4,4.0,4.1,4.1'
$\varepsilon_{eff}$ effective relative permittivity
h distance between adjacent rows 9 of a region 8.0,8.1,8.1'
w width of a de-coated structure 4,4.0,4.1,4.1'
λ wavelength
Y detail
Z detail
I outer face of the second pane 1.2
II inner face of the second pane 1.2
III outer face of the first pane 1.1
IV inner face of the first pane 1.1
V face of the intermediate layer 2
VI face of the intermediate layer 2

The invention claimed is:

1. A pane comprising:
at least one first pane with an outer face and an inner face;
at least one transparent and electrically conductive coating arranged on the outer face and/or the inner face of the first pane; and
at least two busbars for connection to a voltage source, the at least two busbars being connected to the transparent and electrically conductive coating such that a current path for a heating current is formed between the busbars,
wherein the transparent, electrically conductive coating has at least three regions with de-coated structures,
wherein the at least three regions include a first region, a second region and a third region, the second region being a central region,
wherein the at least three regions are arranged adjacent one another and along the current path,
wherein each region of the at least three regions has at least two rows of de-coated structures,
wherein the de-coated structure is shaped as a de-coated rectangular frame with a width and a length greater than the width, wherein a maximum angle between a longitudinal direction of the de-coated structure and a direction of the current path has an average value of less than or equal to 30°, and wherein the de-coated structure is completely bordered by the transparent electrically conductive coating,
wherein the length to the width ratio is greater than 5:1, and
wherein a proportion of an area of the de-coated structures to the total area in the central region is less than a proportion of an area of the de-coated structures to a total area in the first region and/or the third region.

2. The pane according to claim 1, wherein the length of the de-coated structure is from 8 mm to 150 mm.

3. The pane according to claim 1, wherein the length of the de-coated structure is from $\lambda/(7*\sqrt{\varepsilon_{eff}})$ to $(3*\lambda)/(2*\sqrt{\varepsilon_{eff}})$, where $\varepsilon_{eff}$ is an effective relative permittivity of the pane and λ indicates a wavelength for which transmission through the pane is optimizable.

4. The pane according to claim 1, wherein a length of the de-coated structure in a central region of the at least three regions is greater than a length of the de-coated structure in the first region and/or a length of the de-coated structure in the third region.

5. The pane according to claim 1, wherein a line width of the de-coated structure is from 25 μm to 300 μm.

6. The pane according to claim 1, wherein a periodic distance between two de-coated structures immediately adjacent in a row is from 4 mm to 20 mm and/or a ratio of the distance to the width is from 3:1 to 20:1.

7. The pane according to claim 1, wherein a minimum distance in the direction of the current path between adjacent rows is from 2 mm to 150 mm.

8. The pane according to claim 1, wherein the at least three regions have at least two rows each and/or each row has at least two de-coated structures.

9. The pane according to claim 1, wherein the first pane and/or the second pane contains glass and/or has an effective relative permittivity from 2 to 8.

10. The pane according to claim 1, wherein the transparent and electrically conductive coating contains at least one metal, carbon nanotubes and/or optically transparent and electrically conductive polymers.

11. A laminated pane comprising:
the pane according to claim 1, and
a second pane areally bonded to the pane via at least one intermediate layer.

12. A pane arrangement comprising:
the pane according to claim 1, and
a transmitting and/or receiving unit with a transmitting and/or receiving region, wherein:
the transmitting and/or receiving unit is arranged on one face of the pane and the transmitting and/or receiving region is aligned on the pane such that an incoming signal from an opposite side can be acquired or sent to the opposite side, a central region of the at least three regions of the pane is configured such that the incoming signal strikes or exits the pane at a maximum angle of incidence from 5° to 30°, and in a first or third region of the at least three regions of the pane a value of the angle of incidence is greater than the maximum angle of incidence.

13. A pane arrangement comprising:

the laminated pane according to claim 11, and a transmitting and/or receiving unit with a transmitting and/or receiving region, wherein:

the transmitting and/or receiving unit is arranged on one face of the laminated pane and the transmitting and/or receiving region is aligned on the laminated pane such that an incoming signal from an opposite side can be acquired or sent to the opposite side, a central region of the at least three regions of the pane is configured such that the incoming signal strikes or exits the pane at a maximum angle of incidence from 5° to 30°, and in a first or third region of the at least three regions of the pane a value of the angle of incidence is greater than the maximum angle of incidence.

14. The pane arrangement according to claim 12, wherein a distance between the transmitting and/or receiving unit and the pane is greater than 80 mm.

15. A glazing with low transmission attenuation for high-frequency electromagnetic radiation comprising the pane according to claim 1, the glazing being located in a structure selected from the group consisting of a vehicle body, a vehicle door, a means of transportation on land, a means of transportation on water, a means of transportation in the air, an external facade of a building, a building window, a built-in part of furniture, and a built-in part of appliances.

* * * * *